US012108212B2

(12) United States Patent
Kaiser

(10) Patent No.: US 12,108,212 B2
(45) Date of Patent: Oct. 1, 2024

(54) ACOUSTIC BENDING CONVERTER SYSTEM AND ACOUSTIC APPARATUS

(71) Applicant: Fraunhofer-Gesellschaft zur Förderung der angewandten Forschung e.V., Munich (DE)

(72) Inventor: Bert Kaiser, Dresden (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 226 days.

(21) Appl. No.: 17/524,577

(22) Filed: Nov. 11, 2021

(65) Prior Publication Data

US 2022/0070591 A1 Mar. 3, 2022

Related U.S. Application Data

(63) Continuation of application No. PCT/EP2020/063187, filed on May 12, 2020.

(30) Foreign Application Priority Data

May 14, 2019 (EP) .................................... 19174497

(51) Int. Cl.
*H04R 17/02* (2006.01)
*H04R 19/00* (2006.01)

(52) U.S. Cl.
CPC ......... *H04R 17/025* (2013.01); *H04R 19/005* (2013.01); *H04R 2201/003* (2013.01)

(58) Field of Classification Search
CPC ................ H04R 17/025; H04R 19/005; H04R 2201/003; H04R 7/06; H04R 17/00; H04R 31/006; H04R 2460/13; H04R 17/10; H04R 25/606; H04R 7/10; H02N 2/04; H02N 2/18
See application file for complete search history.

(56) References Cited

U.S. PATENT DOCUMENTS

| | | | | |
|---|---|---|---|---|
| 6,351,541 | B1 | 2/2002 | Zinserling | |
| 10,455,311 | B2 * | 10/2019 | Magariyachi | H04R 1/1075 |
| 10,483,876 | B2 | 11/2019 | Langa et al. | |
| 11,186,478 | B2 * | 11/2021 | Langa | B81B 3/0013 |
| 2012/0061173 | A1 | 3/2012 | Gaudriot et al. | |
| 2017/0164093 | A1 * | 6/2017 | Silvestri | H04R 1/1016 |
| 2018/0035200 | A1 | 2/2018 | Abe et al. | |
| 2018/0179048 | A1 * | 6/2018 | Schenk | H04R 9/02 |

(Continued)

FOREIGN PATENT DOCUMENTS

| | | | |
|---|---|---|---|
| CN | 106465009 | B | 1/2019 |
| DE | 19612481 | A1 | 10/1997 |

(Continued)

*Primary Examiner* — Angelica M Mckinney
(74) *Attorney, Agent, or Firm* — PERKINS COIE LLP; Michael A. Glenn

(57) ABSTRACT

An acoustic bending converter system may have a plurality of bending converters configured such that deformable elements of the bending converters oscillate coplanarly in a common planar layer, wherein the bending converters include different resonance frequencies and different expansions of the deformable elements along a common longitudinal axis which is transversal to a direction of oscillation of the deformable elements.
Further, an acoustic apparatus may have such an acoustic bending converter system.

15 Claims, 10 Drawing Sheets

(56) References Cited

U.S. PATENT DOCUMENTS

| | | | |
|---|---|---|---|
| 2020/0087138 | A1* | 3/2020 | Schenk ................. B81B 3/0021 |
| 2020/0196067 | A1 | 6/2020 | Rusconi Clerici Beltrami et al. |
| 2020/0221238 | A1 | 7/2020 | Bottoni et al. |
| 2021/0166674 | A1* | 6/2021 | McCutcheon ....... H04R 1/1083 |
| 2021/0227329 | A1* | 7/2021 | Ogata ...................... H02N 2/04 |
| 2022/0174438 | A1* | 6/2022 | Merca .................... H04R 25/65 |

FOREIGN PATENT DOCUMENTS

| | | | | |
|---|---|---|---|---|
| DE | 102010029936 | A1 * | 12/2011 | ............. H04R 19/04 |
| DE | 102014225934 | A1 | 6/2016 | |
| DE | 102015206774 | A1 | 10/2016 | |
| DE | 102015210919 | A1 | 12/2016 | |
| DE | 102017108594 | A1 | 10/2018 | |
| DE | 102017206766 | A1 | 10/2018 | |
| DE | 102017114008 | A1 | 12/2018 | |
| EP | 2986024 | A1 | 2/2016 | |
| EP | 3279622 | A1 | 2/2018 | |
| TW | 201709752 | A | 3/2017 | |
| TW | 201810253 | A | 3/2018 | |
| WO | 0041432 | A2 | 7/2000 | |
| WO | 2010133782 | A1 | 11/2010 | |
| WO | 2012095185 | A1 | 7/2012 | |
| WO | 2016202790 | A2 | 12/2016 | |

* cited by examiner

ACOUSTIC BENDING CONVERTER SYSTEM AND ACOUSTIC APPARATUS

CROSS-REFERENCES TO RELATED APPLICATIONS

This application is a continuation of copending International Application No. PCT/EP2020/063187, filed May 12, 2020, which is incorporated herein by reference in its entirety, and additionally claims priority from European Application No. EP 19 174 497.8, filed May 14, 2019, which is incorporated herein by reference in its entirety.

Embodiments according to the invention relate to a micromechanical sound converter.

BACKGROUND OF THE INVENTION

The technical field of the present invention can be attributed to the following three documents describing micromechanical devices:

WO 2012/095185 A1/Title: MIKROMECHANISCHES BAUELEMENT

WO 2016/202790 A2/Title: MEMS TRANSDUCER FOR INTERACTING WITH A VOLUME FLOW OF A FLUID AND METHOD FOR PRODUCING SAME

DE 10 2015 206 774 A1

Basically, these documents disclose the structure of bending converters and their specific options and mechanisms of interacting with the environment. In particular, the above-stated documents relate to a novel MEMS (microelectromechanical system) actuator principle which is based on the fact that a silicon beam moves laterally in a plane, for example a substrate plane defined by a silicon disc or a wafer. Here, the silicon beam connected to the substrate in a cavity interacts with a volume flow. The novel MEMS described therein are defined as NED (Nanoscopic Electrostatic Drive).

Due to their proportions, these NEDs are particularly suitable for miniaturization (reduction of components while maintaining the complete functional range) of everyday devices that are subject to increased integration requirements. For example, ultra-mobile terminal devices, such as smart watches or hearables are subject to very tight limits of installation space design. With the above-stated NED, among others, sound converters can be realized that can comply with these increased demands, wherein both sound quantity as well as sound quality can be significantly increased compared to conventional sound converters. Here, the integration requirements relate both to the adaption to existing installations space in general as well as to the system design together with several components.

Document DE 10 2017 114 008 A1 discloses a hearing aid or headphones designed such that the outer dimensions of the housing correspond to the inner dimensions of the auditory canal. An MEMS-based sound converter is arranged in the housing such that a front volume is formed in the direction of the eardrum and a rear volume is formed in the direction of the earpiece, which are separated from one another by the MEMS-based sound converter. Regarding its geometrical dimensions, this sound converter is configured such that the same does not limit the geometrical dimensions of the resonance volumes, however, it is difficult to keep a frequency response constant across a large frequency range. Above that, the sound converter consists of bending converters elastically suspended on one side that extend across a cavity and whose edge area is spaced by a gap at a front side. By the curvature of the sound converters, the gap increases. Further, sound shielding means formed by lateral walls are disclosed, the so-called sound blocking walls of the cavity. These walls are arranged such that the same at least partly prevent lateral sound passage along the gap. It is a disadvantage of the disclosure that the sound converters are piezoelectric and are therefore subject to pre-curvature, such that the disclosed measures serve to minimize the inaccuracies occurring due to this pre-curvature.

Document DE 10 2017 108 594 A1 discloses a loudspeaker unit for a portable device for generating sound waves in the audible range which is characterized by a low structural size and high performance. Apart from the electrodynamic loudspeaker, the loudspeaker unit comprises an MEMS-based high-range loudspeaker, wherein the frequency ranges of both loudspeakers overlap. Thereby, the electrodynamic loudspeaker is formed in a compact manner and optimized for low frequencies. However, high spatial requirements and the high power consumption are still disadvantageous since two different system technologies have to be operated.

Further, document DE 196 124 81 A1 discloses an arrangement of sound converter for hearing aids tilted with respect to a longitudinal axis. The sound-generating membrane is a conductive film arranged between two surface electrodes and by the oscillations of which sound is generated in the audible wavelength spectrum. This film is not arranged in parallel with respect to the eardrum whereby undesired resonances in the auditory canal are minimized. However, in this structure, no further functional elements can be monolithically integrated and therefore additional space is needed outside the auditory canal.

Known solutions dispense with a particularly dense packing of sound converters or use external assembly methods for supplementing individual functions (for example electrical connection).

Considering the above, there is a need for a concept allowing increased packing density of devices compared to known technology in order to effectively and efficiently realize high sound pressure.

SUMMARY

According to an embodiment, an acoustic bending converter system may have: a plurality of bending converters configured such that deformable elements of the bending converters oscillate coplanarly in a common planar layer, wherein the bending converters include different resonance frequencies and different expansions of the deformable elements along a common longitudinal axis that is transversal to a direction of oscillation of the deformable elements.

According to another embodiment, an acoustic apparatus may have: an acoustic bending converter system including at least one bending converter including at least one deformable element arranged in a cavity, and an opening through which a fluidic volume flow interacting with a movement of the bending converter in the cavity passes and a housing adapted to be inserted into an auditory canal, wherein the bending converter system is held in the housing such that the fluidic volume flow is oriented obliquely to a longitudinal axis of the auditory canal and disposed in the auditory canal in a state where the housing is inserted in the auditory canal.

For example, high reproduction quality is ensured in an environment around the bending converter system by a compact arrangement of a plurality of bending converters of a bending converter system that is configured as a sound converter and allows an integration of further system components within limited spatial conditions. The frequency response reproduced by the sound converter as it results for the combination of converter and surrounding installation space can be kept constant across a large frequency range such as via the oblique orientation of the volume flow in a canal, such as an auditory canal. One variation can, for example, be less than 6 dB.

The application describes a further development regarding optimization of the arrangement of bending converters regarding space requirements, sound pressure level and sound quality that can be provided by the NED in a specific environment, for example, in the auditory canal of a human ear.

An acoustic bending converter system having a plurality of bending converters is suggested, which are configured such that deformable elements of the bending converter oscillate coplanarly in a common planar layer, wherein the bending converters comprise different resonance frequencies and different expansions of the deformable elements along a common longitudinal axis which is transversal to a direction of oscillation of the deformable elements. The bending converters can, for example, be electrostatic bending actuators (NED actuators), piezoelectric actuators or thermomechanical actuators. The plurality of bending converters is configured for deflecting in an oscillation plane. Here, the bending converters are arranged side by side in the common planar layer or oscillation plane along a first axis and extend along a second axis that is transversal to the first axis. For fully using the spatial conditions within the same common planar layer, individual or several bending converters can also be arranged obliquely to the plurality of bending converters oriented in parallel.

A further aspect of the application relates to an acoustic apparatus, such as a hearing aid, comprising: an acoustic bending converter system with at least one bending converter comprising at least one deformable element arranged within a cavity, and an opening through which a fluidic volume flow interacting with a movement of the bending converter in the cavity passes, and a housing adapted to be inserted into a canal, wherein the bending converter system is held in the housing such that the fluidic volume flow can be oriented obliquely to a longitudinal axis of the canal in a state when the housing is inserted in the canal. The acoustic apparatus can be miniaturized and is hence particularly suitable for incorporation into in-ear-listening aids (IdO) and hearables as well as smart watches and further ultra-mobile terminal devices.

Advantages and functionalities of the features of the acoustic bending converter system as described above and below apply accordingly to an acoustic apparatus provided with the same.

According to an embodiment, the bending converter system comprises one or several cavities in which the bending converters are arranged and one or several openings in the cavities through which a fluidic volume flow interacting with a plurality of bending converters can pass. Here, the openings in the cavities can be common openings of two or several cavities communicating with each other via the fluidic volume flow. Above that, openings in the cavities of the bending converter system enable communication of individual bending converters or the bending converter system with a surrounding environment.

According to an embodiment, the bending converters are arranged in a space limited by first and second substrates in parallel to the common oscillation plane and walls between the substrates dividing the space along a longitudinal direction or in a direction transversal to the longitudinal direction in the common oscillation plane into cavities that are arranged between adjacent bending converters. In that way, a cavity is limited, for example, by the first substrate, the second substrate as well as two opposite walls from adjacent bending converters. Since the plurality of bending converters is configured to be deflected in the common oscillation plane of a layer via their deformable elements, the bending converters can have a distance to the first substrate and the second substrate by which the adjacent cavities can be fluidically coupled to one another. By fluidic coupling of adjacent cavities, the plurality of bending converters can apply a common force on a fluid within the cavities whereby a high sound level can be realized with the micromechanical sound converter.

Depending on the embodiment, each bending converter of the acoustic bending converter system can include a deformable element that is electrostatically, piezoelectrically or thermoechanically deformable. This results in a plurality of options for adapting the bending converter system to desired requirements in a flexible manner.

Above that, it is particularly advantageous in the acoustic bending converter system when at least a first subset of at least one first bending converter comprises one cantilevered deformable element each and additionally or alternatively at least a second subset of at least one second bending converter comprises one deformable element clamped on two sides. A grouping of individual subsets of specific bending converters allows, on the one hand, an appropriate usage of the installation space and at the same time a specific localization of similar bending converters for generating desired frequencies or sound pressures. Due to the fact that the deformable element of each bending converter can be cantilevered or clamped on two sides, bending converters having deformable elements with different mechanical characteristics and dimensions can be realized, which are again responsible for generating different frequencies and sound pressures. Further, an installation space existing in the same layer of the bending converter system can be used in a particularly advantageous manner.

Here, advantageously, for cantilevered bending converters a greater oscillation amplitude results at higher frequencies since the cantilevered bending converters are characterized by an advantageous ratio of mass to length of the deformable element of the bending converter.

In order to be able to reproduce different frequencies and/or to generate different sound pressures, according to a particularly advantageous embodiment, the at least first subset of at least one first bending converter comprises, on average, a higher resonance frequency than the at least second subset of at least one second bending converter or vice versa. Due to specific requirements for the installation space as well as with regard to the different frequencies and their sound pressures, stiffness, mass, length and cross-sectional geometry of the deformable elements of the respective bending converters can be adapted.

In order to be able to reproduce different frequencies and/or to generate different sound pressures in a very simple and dedicated manner, the first subset of at least one first bending converter comprises, on average, a shorter length than the second subset of at least one second bending converter.

According to a particularly advantageous embodiment, each bending converter limits two opposite cavities, wherein each cavity is accessible via at least one opening for a passage of the fluidic volume flow. Thereby, it is possible to fluidically couple the individual cavities and to thereby specifically control the characteristics of the volume flow transported by the individual bending converters, which can be desirable, in particular, with respect to a pressure or sound pressure of the volume flow that can be built up.

For generating sound pressures in a frequency spectrum accessible to human hearing by means of the acoustic bending converter system, it is recommended to provide deformable elements having a length of more than 100 μm in the bending converters. For allowing a very compact structure of miniaturized sound converters, the deformable element of each bending converter should have a length of less than 4000 μm. For space-saving incorporation of the bending converter system into a longitudinally extended sleeve, external dimensions of the bending converter system along the common longitudinal axis are at a maximum lateral to the common planar layer and greater than external dimensions of the bending converter system lateral thereto.

In a particularly advantageous embodiment, the external dimensions of the bending converter system along the common longitudinal axis are between 750 μm and 2000 μm. In an even more advantageous embodiment, the external dimensions of the bending converter system along the common longitudinal axis are between 800 μm and 1200 μm. Bending converter systems having the above-stated external dimensions can be incorporated in a space-saving manner in in-ear-hearing aids, wherein a sufficient listening quality for the user can be ensured.

In particularly advantageous embodiments, an external surface of the bending converter describes a longitudinal oval along the common longitudinal axis, a longitudinal rectangle along the common longitudinal axis or a longitudinal polygon along the common longitudinal axis, coplanar to the common planar layer. Such longitudinal shapes allow to make good use of the installation space in a longitudinally extended sleeve with a cylindrical or rectangular cross section. Above that, by a suitable selection of the external surface or an external contour of the bending converter system, an inner cross-section of a longitudinally extended sleeve can essentially be completely filled, for example, an auditory canal can be sealed.

According to an advantageous embodiment, the bending converters are divided into groups of one or several bending converters, wherein, in groups of several bending converters, the several bending converters are arranged behind one another along the common longitudinal axis. In such an arrangement, the individual pressures of the volume flow effected by the respective deformable elements of the bending converters would add up. Consequently, by advantageous staggering or grouping of the bending converters and their selective activation, not only a desired pressure or sound pressure of the volume flow dispensed into the environment could be specifically controlled, but also different sound frequencies could be generated. Short bending converters, for example, can be arranged in the area of the openings since the same are characterized by comparatively high stiffness in relation to long bending converters, whereby high resonance frequencies become possible. As long as such bending converters are arranged in the area of the openings connecting the cavities with the environment, resonances can be prevented and hence sound quality or listening quality can be improved. Additionally, or alternatively, according to a further advantageous embodiment, the bending converters are divided into groups of one or several bending converters, wherein in groups of several bending converters the several bending converters are arranged side by side in the common plane transversal to the common longitudinal axis. Analogously to the arrangement of several bending converters along the common longitudinal axis behind one another, in the arrangement transversal to the common longitudinal axis side by side, a desired sound pressure and localization of the sound can also be controlled.

Advantageously, the fluidic volume flow in the bending converter system of the acoustic apparatus runs in the plane of the common planar layer of the bending converter system. Due to the arbitrary design and orientation of the cavities and deformable elements of the individual bending converters of the bending converter system, a specific course of the fluidic volume flow in the bending converter system can be provided and hence controlled. Thus, the volume flow can specifically be guided to the location where its effect on the environment is optimum.

In order to obtain a particularly advantageous interaction with the environment of the acoustic apparatus, the bending converter system is held in the housing such that the fluidic volume flow of the acoustic apparatus passes through the openings of the bending converter system at an angle between 5° and 80°, between 10° and 40° or between 15° and 30° inclined with respect to the longitudinal axis of the canal. By the arrangement of the bending converters relative to the longitudinal axis of the canal, the deformable elements are positioned in an antiparallel manner with respect to their orientation, for example, in direction of the eardrum of a human ear, such that resonances in the auditory canal are minimized. Above that, a higher packing density of the bending converters can be obtained and higher sound pressures in relation to a cross-sectional area of the canal can be obtained, wherein a greater acoustic active surface of the acoustic apparatus is generated.

In order to be able to use the acoustic apparatus in a particularly efficient manner, the acoustic bending converter system can receive and/or emit an acoustic signal via the fluidic volume flow passing through the openings. Thereby, the acoustic bending converter system is able to simultaneously operate as receiver and/or transmitter of acoustic signals, which again significantly increases the flexibility during the usage of the acoustic apparatus. Here, transmitting or receiving acoustic signals can take place alternately or continuously.

According to an advantageous embodiment, the acoustic apparatus further comprises: a control unit for controlling the individual bending converters of the bending converter system and an energy supply source for operating the acoustic apparatus. Due to the manifold options of miniaturization of the acoustic bending converter system, additionally, further devices or members can be incorporated therein in a space-saving manner despite low dimensions of the acoustic apparatus. This essentially contributes to the increase of wearing comfort and user friendliness of the acoustic apparatus.

For obtaining a particularly high flexibility in the usage of the acoustic apparatus, two or more acoustic bending converter systems can be held in the housing, wherein the common planar layer of the same is orientated in parallel. Thereby, for example, acoustic apparatuses can be arranged or produced in the form of a substrate stack, whereby highly complex structures can be implemented with relatively low production costs. Above that, in that way, the acoustic apparatus can also easily be adapted in an individual manner. Finally, by stacking several acoustic bending converter systems, a higher sound pressure can be generated and/or a greater displayable frequency range can be covered.

Advantageously, the acoustic apparatus can be structured monolithically of several layers or of substrates of different materials that are bonded or connected to one another via a common layer. This can take place, for example, in the form of arranging a lid wafer above or a handling wafer below a common device wafer.

For providing a particularly space-saving and compact form of the acoustic apparatus, the control unit and/or the energy supply source are arranged in the common planar layer of a bending converter system. Obviously, the control unit is configured for fluid dynamic attenuation, for signal processing, for wireless communication, for voltage transformation. The same can include sensors, software for storing data etc. that are arranged individually or together in the same acoustic apparatus or that are alternatively provided separately from the acoustic apparatus.

Embodiments according to the present invention will be discussed in more detail below with reference to the accompanying drawings. Regarding the illustrated schematic figures, it should be noted that the illustrated functional blocks can be considered both as elements or features of the inventive apparatus as well as respective method steps of the inventive method and respective method steps of the inventive method can also be derived therefrom.

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present invention will be discussed in more detail below with reference to the drawings, it should be noted that identical, functionally equal or equal elements, objects and/or structures in the different figures are provided with the same or similar reference numbers such that the description of these elements illustrated in different embodiments is interexchangable or interapplicable.

Figure 1:
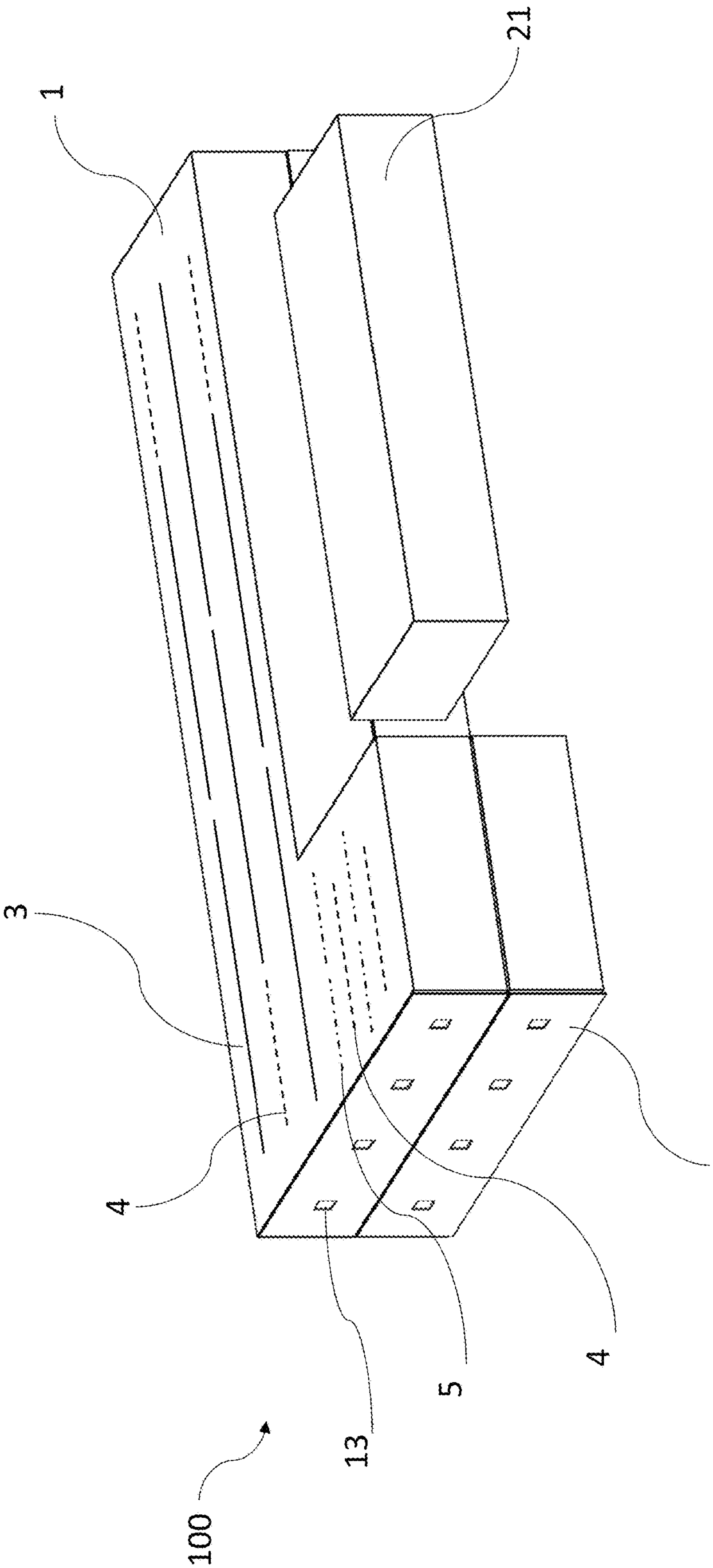
FIG. 1 shows, in a perspective illustration, a bending converter system according to an embodiment of the present invention.

FIG. 1 shows, in a perspective illustration, a bending converter system according to an embodiment of the present invention in the form of a layered device 100 including a first bending converter system 1 and a second bending convert system 2 stacked on top of one another. The device 100 can include further bending converter systems that are arranged in layers, for example, at the bending converter system 1 and/or at the bending converter system 2. A bending converter system 1 or a bending converter system 2 includes several bending converters 3, 4 having the same or differing predefined lengths. On the surface of the bending converter system 1, an arrangement of the bending converters 3, 4 of different length is illustrated exemplarily. Here, the bending converter 3, indicated by means of a continuous line, is longer than the bending converter 4 indicated by means of a short dotted line. In the present embodiment, both the bending converter system 1 as well as the bending converter system 2 are configured in an L-shaped manner, such that the two bending converter systems 1 and/or 2 stacked on top of one another are stacked to an L-shaped device 100. The individual legs of the L-shaped device 100 have a different length. In an area of a shorter leg of the L-shaped device 100, further bending converters 4 as well as bending converters 5 having a third length are arranged, indicated by means of a dot-dashed line. The lengths of the individual converters 3, 4 and 5 are, for example: bending converter 3 from 1000 μm to 4000 μm; bending converter 4 from 500 μm to 2000 μm; bending converter 5 from 100 μm to 1000 μm.

According to an advantageous embodiment, the individual length ratio can be selected, for example, as follows: bending converter 3 to bending converter 4 between 1:1.5 to 1:3; bending converter 3 to bending converter 5 between 1:1.5 to 1:3; or the length ratio of the bending converter 4 to the bending converter 5 between 1:1.5 to 1:3.

In the present embodiment, the individual bending converter systems 1 or 2 are made up of bending converters 3, 4 and 5 that are arranged parallel to one another in a plane of the bending converter system 1 or the bending converter system 2, wherein the individual bending converters 3, 4 and 5 are orientated along the longer leg of the L-shaped device 100. On the front side in the longitudinal direction of the device 100, openings 13 are provided allowing a connection of the cavities (not shown herein) included in the bending converter system 1 or bending converter system 2 to the environment. Due to the L shape of the device 100, the individual bending converters 3, 4 and 5 are arranged such that short bending converters 4, 5 are arranged in the shorter leg of the L-shaped device 100, wherein the longer bending converters 3 are arranged in the longer leg of the L-shaped device.

In this embodiment, the bending converters 3, 4 and 5 are orientated along the longest side of the device. Deviating therefrom, embodiments can also include a bending converter orientation along the shortest side of the bending converter system 1 and/or 2 or device 100. Accordingly, the openings 13 are then not arranged in the area 13 but in the area of the clamps of the bending converters 3, 4 clamped on both sides or in the area of the clamp 14 and the freely movable end of a cantilevered bending converter 5.

The bending converters 3, 4 and 5 are arranged such that short bending converters 5 are arranged close to the openings 13. This results, on the one hand, in the advantage that a higher packing density can be obtained within the bending converter system 1 and/or 2 and that this results in higher sound pressures. On the other hand, resonances can be prevented, which has a positive effect on the sound quality.

In the present embodiment, a control unit 21 is arranged adjacent to the layered device 100 such that the same supplements the device 100 to a rectangular form, complimentary to the L-shape of the device 100. Thereby, an existing installation space available between the legs of the L-shaped device 100 is utilized, which results in a particularly compact form.

Embodiments are not limited to the L-shaped configuration of the outer dimensions of the device. Further embodiments are not limited to the illustrated arrangement of the bending converters 3, 4 and 5, rather the arrangement can be different for each bending converter system 1 or 2 (cf. FIG. 9).

Figure 2:
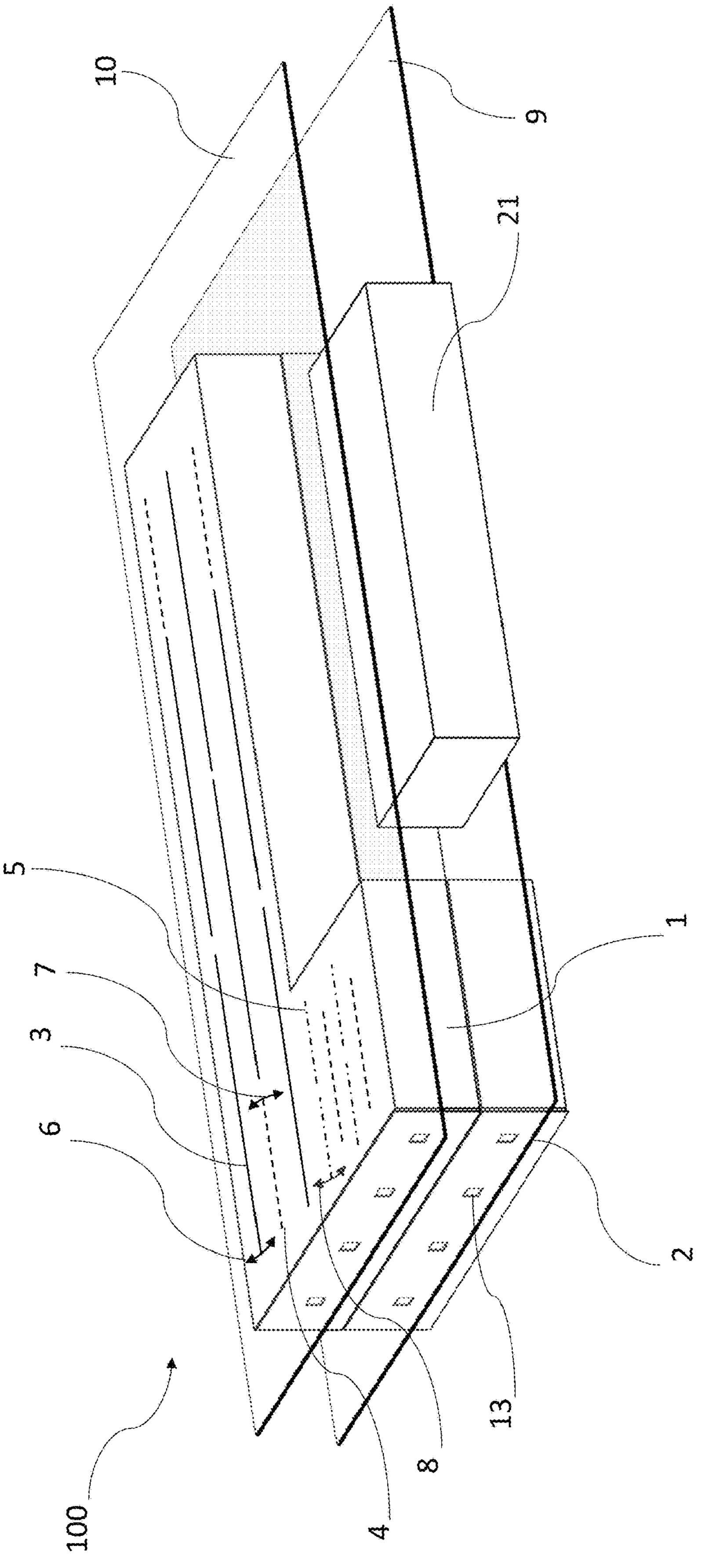
FIG. 2 shows, in a perspective illustration, the embodiment of FIG. 1 with substrate planes.

FIG. 2 shows the embodiment of FIG. 1 in a perspective illustration. Additionally, a substrate plane 9 of a substrate layer is illustrated which runs parallel to the substrate layer. Further, it is illustrated that a common movement plane 10 is formed of the directions of movement 6, 7 and 8 of the respective bending converters, wherein the deformable elements of the bending converters 3, 4 and 5 oscillate coplanarly in a common planar substrate layer or movement plane 10. The movement plane 10 and the substrate plane 9 are arranged parallel to one another.

Figure 3:
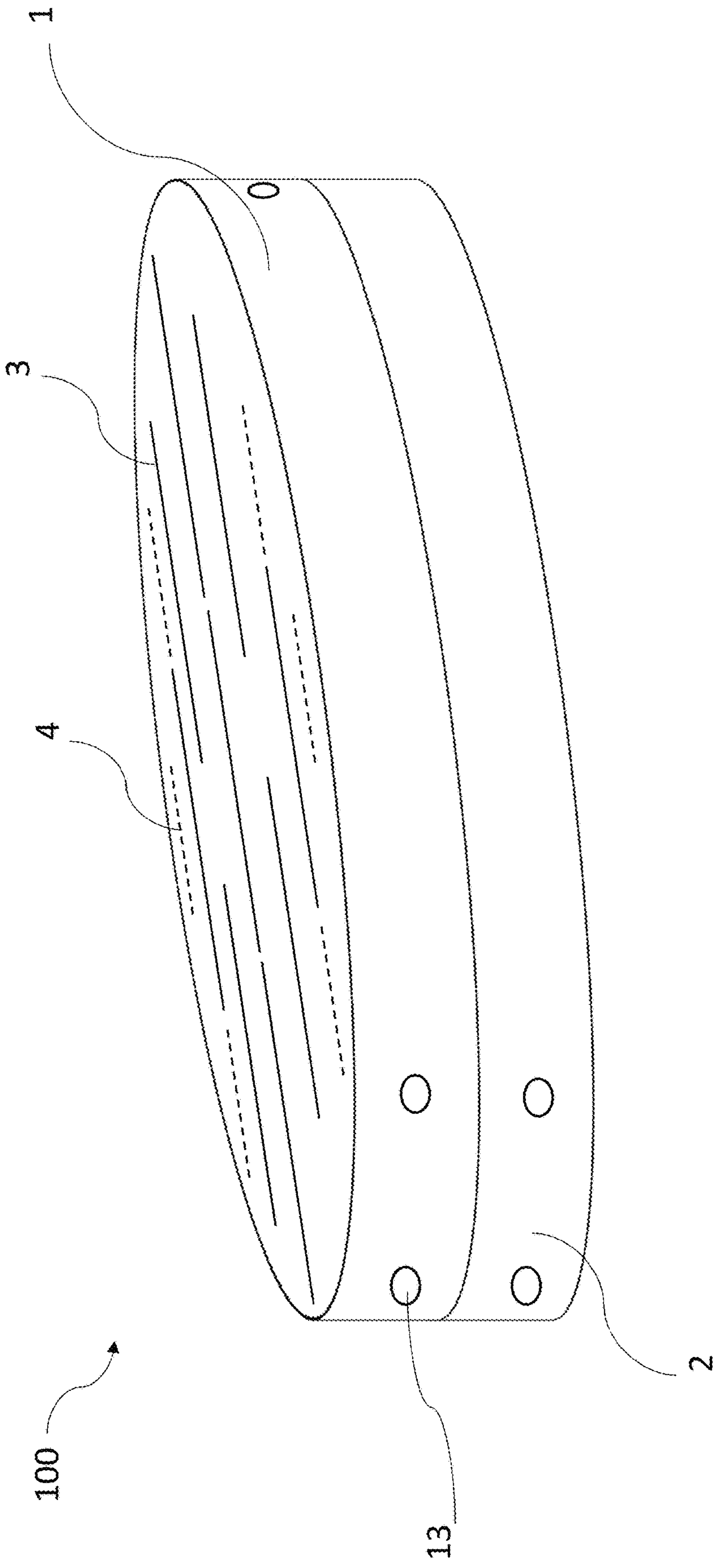
FIG. 3 shows, in a perspective illustration, a bending converter system according to a further embodiment of the present invention.

FIG. 3 shows an embodiment of a device 100 with two stacked bending converter systems 1 and 2 having an oval outer shape in a perspective illustration. The openings 13 are advantageously arranged in the area of the clamps 14 of the bending converters 3, 4 clamped on both sides or in the area of the clamp 14 and the freely movable end of a cantilevered bending converter 5. An oval outer geometry or shape of the device 100 has the advantage that the same can be arranged in a tilted manner in a cylinder shaped or almost cylinder shaped housing of an ultra-mobile terminal device.

This embodiment shows an arrangement of the bending converters 3, 4 and 5 along the longest orientation of the oval device geometry. In the same way, embodiments can include deviating orientations of the bending converters 3, 4 and 5 or can include orientations of the bending converters 3, 4 and 5 deviating therefrom. Above that, embodiments can include differing orientations of the bending conversions 3, 4 and 5 for each layered bending converter system 1 or 2, 2+n.

Further advantageous embodiments are not limited to this oval shape and are adapted or adaptable to the given spatial conditions and acoustic boundary conditions in order to obtain a maximum sound pressure.

Figure 4:
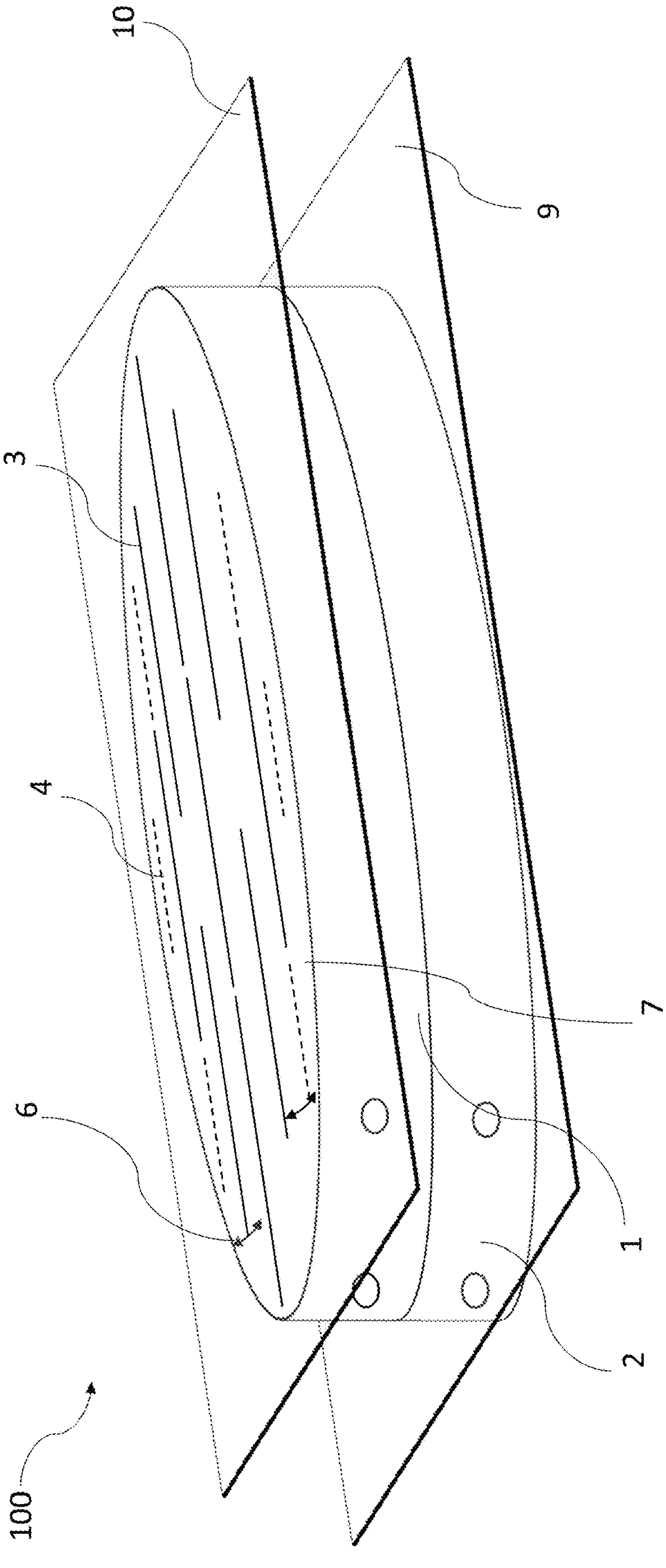
FIG. 4 shows, in a perspective illustration, the embodiment of FIG. 3 with substrate planes.

FIG. 4 shows the embodiment of FIG. 3 in a perspective illustration. Additionally, a substrate plane 9 running parallel to the substrate layer is illustrated, wherein the deformable elements of the bending converters 3, 4 and 5 oscillate coplanarly in a common planar substrate layer or movement plane 10. Further, it is illustrated that a movement plane 10 is formed of the directions of movement 6, 7 and 8 of the respective bending converters. The movement plane 10 and the common planar substrate layer or substrate plane 9 are arranged parallel to one another.

Figure 5:
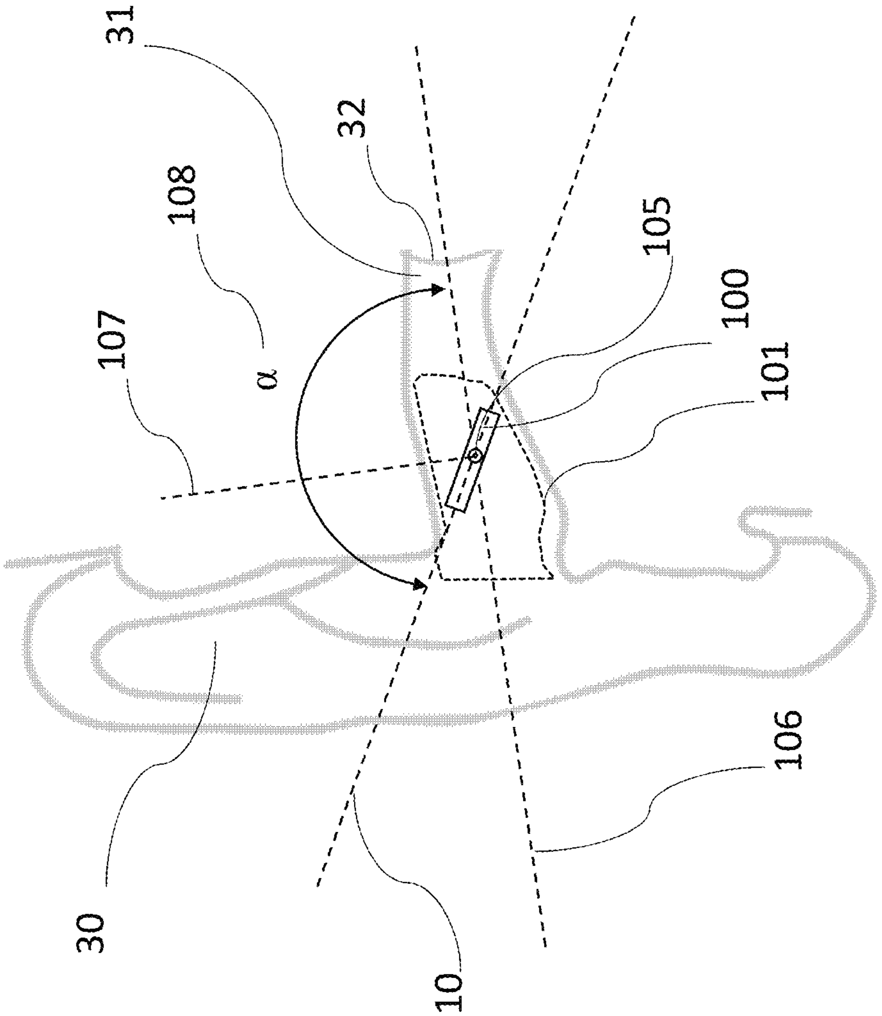
FIG. 5 shows, in a sectional view, the auditory canal, the eardrum and the earpiece of a human ear.

FIG. 5 shows the auditory canal 31, the ear drum 32 and the ear piece 30 in a sectional view. It can be seen that the auditory canal has a cylinder shaped geometry or shape. 101 indicates the outer dimensions of an ultra-mobile terminal device, for example the outer sleeve of its housing that are adapted to the auditory canal 31 and seal the same essentially with respect to the environment. Such housings 101 can be adapted to the respective user but have to be produced individually in expensive, mostly additive and slow methods.

However, they allow an optimum seat of an ultra-mobile terminal device in the auditory canal 31. Embodiments can also have a simplified geometry deviating from the individually adapted geometry produced with inexpensive methods, for example injection-molding methods. These geometries have no optimum fit of the ultra-mobile terminal device or its housing 101 in the auditory canal, which is why high sound pressures at high sound quality are needed to compensate for these inaccuracies. The arrangement of the device 100 or the bending converter system tilted with respect to the longitudinal axis 11 of the housing 101 allows an increase of the acoustically active surface of the device 100 or the bending converter system 1 or 2, on the one hand, for arranging a higher number of bending converters 3, 4 and 5 in the bending converter system 1 or 2 and/or for integrating longer bending converters 3, 4 and 5 in the bending converter system 1 or 2. The device 100 or the bending converter system 1 or 2 is tilted with regard to the longitudinal axis 106 around a transversal axis 105 of the ultra-mobile terminal device, wherein the inclination angle $\alpha$ between the movement plane 10 and the longitudinal axis 106 is in a range between 90° and 180°, advantageously 150° and 170°, particularly advantageously 160°.

By arranging the actuators relative to the housing axis, the deformable elements are positioned anti-parallel with respect to the orientation of the ear drum. This minimizes the resonances in the auditory canal.

Embodiments are not limited to the illustrated tilting around the transversal axis of the housing 101. Obviously, it is also possible to tilt the device 100 around the longitudinal and vertical axis 106 and 107 of the housing 101.

Figure 6A:
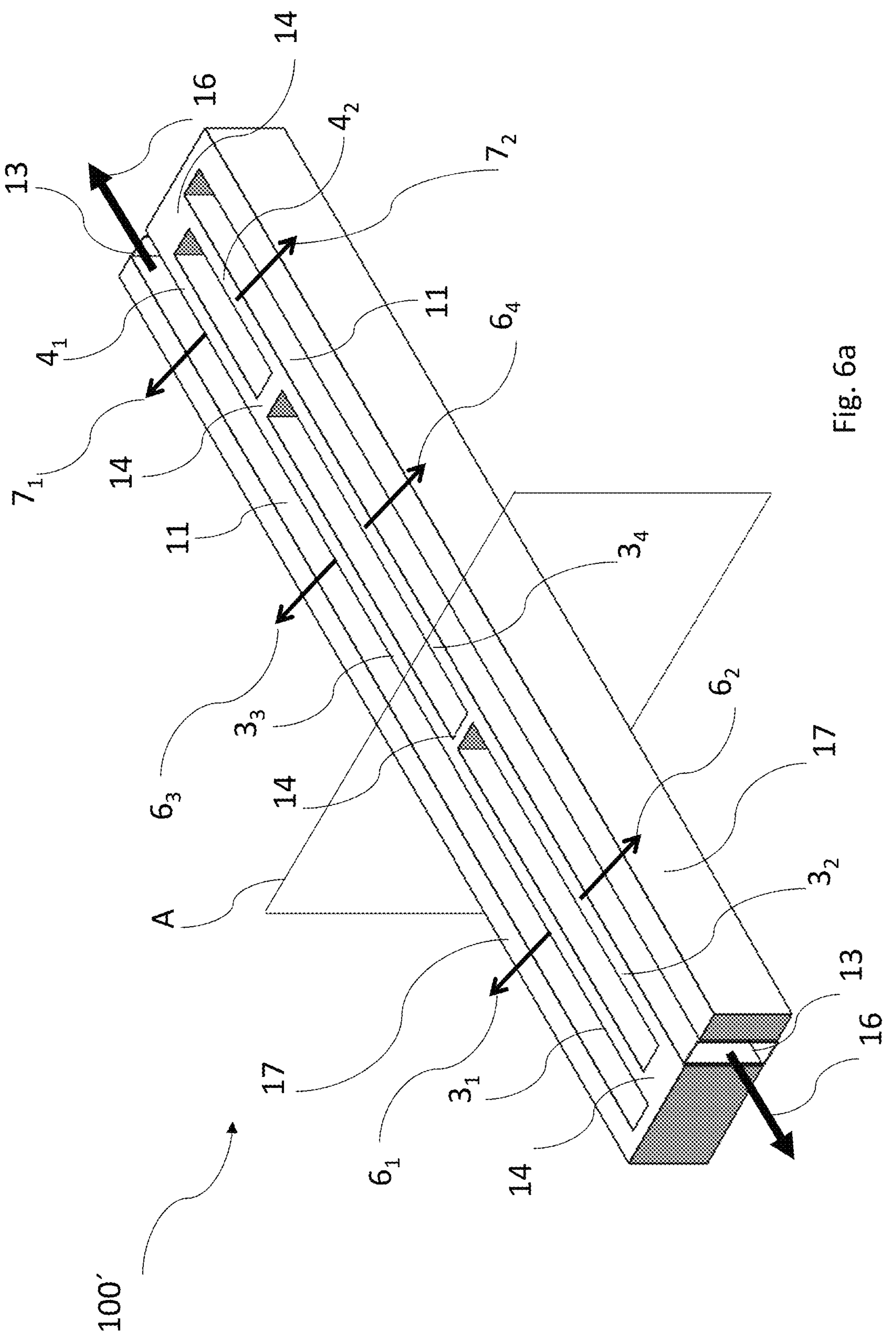
FIG. 6*a* shows, in a perspective illustration, elements of a bending converter system according to an embodiment of the present invention in an excitation state.

FIG. 6*a* shows elements of a device 100' according to an embodiment of the present invention in an excitation state in a perspective illustration.

In particular, FIG. 6*a* shows, in a perspective and highly simplified illustration, a section of a device 100' of a substrate without illustrating a lid wafer 18 and handling wafer 19.

The acoustic apparatus can advantageously be structured monolithically of several layers or of substrates of different materials that are connected or bonded via a common layer. This can take place, for example, in the form of arranging a lid wafer 18 above or a handling wafer 19 below a common device wafer 20.

A cavity 11 is formed by partly removing the material from a device wafer 20, wherein the cavity is defined by a boundary 17 and the respective movable elements or electrodes of the bending converters 32, 34 and 42 as well as by the substrate in the area of the clamp 14. Embodiments include alternative boundaries 17 of the cavity 11. On the one hand, the boundary 17 can be firmly connected to the substrate, on the other hand, the boundary 17 can consist of adjacent electrodes of a further bending converter system 100' formed of further bending converters 3, 4 and 5.

In this embodiment, the illustrated bending converters 32, 34, 42 as well as 31, 32 and 41 are, clamped on both sides and connected to the substrate via the respective clamp 14. Embodiments also include a cantilever which has, compared to the two-sided clamp, the advantage of a large deflection of the freely movable end.

The bending converters 3, 4 and 5 can be both cantilevered or clamped on both sides in a bending converter system 1 and/or 2. Here, it is useful to cantilever the shorter bending converters 4, 5 that are arranged in the area of the openings 13 and to clamp longer bending converters 3 that are arranged towards the center of the member on both sides. This results advantageously in a greater oscillation amplitude at higher frequencies of the shorter cantilevered bending converter 5 since the same are characterized by an advantageous ratio of mass to bending converter length.

Further, the basic functional principle for interaction with a volume flow, for example for sound generation or for pumping a fluid is illustrated in such a bending converter system 1 and/or 2. In a first time interval, the bending converters 31, 32, 41 as well as 32, 34 and 42 move in the direction of the opposite boundary 17 of the cavity 11 and hence reduce the volume within this cavity 11. A volume flow 16 resulting from this volume reduction transports the fluid contained in the cavity 11 out of the cavity 11 through the openings 13.

Figure 6B:
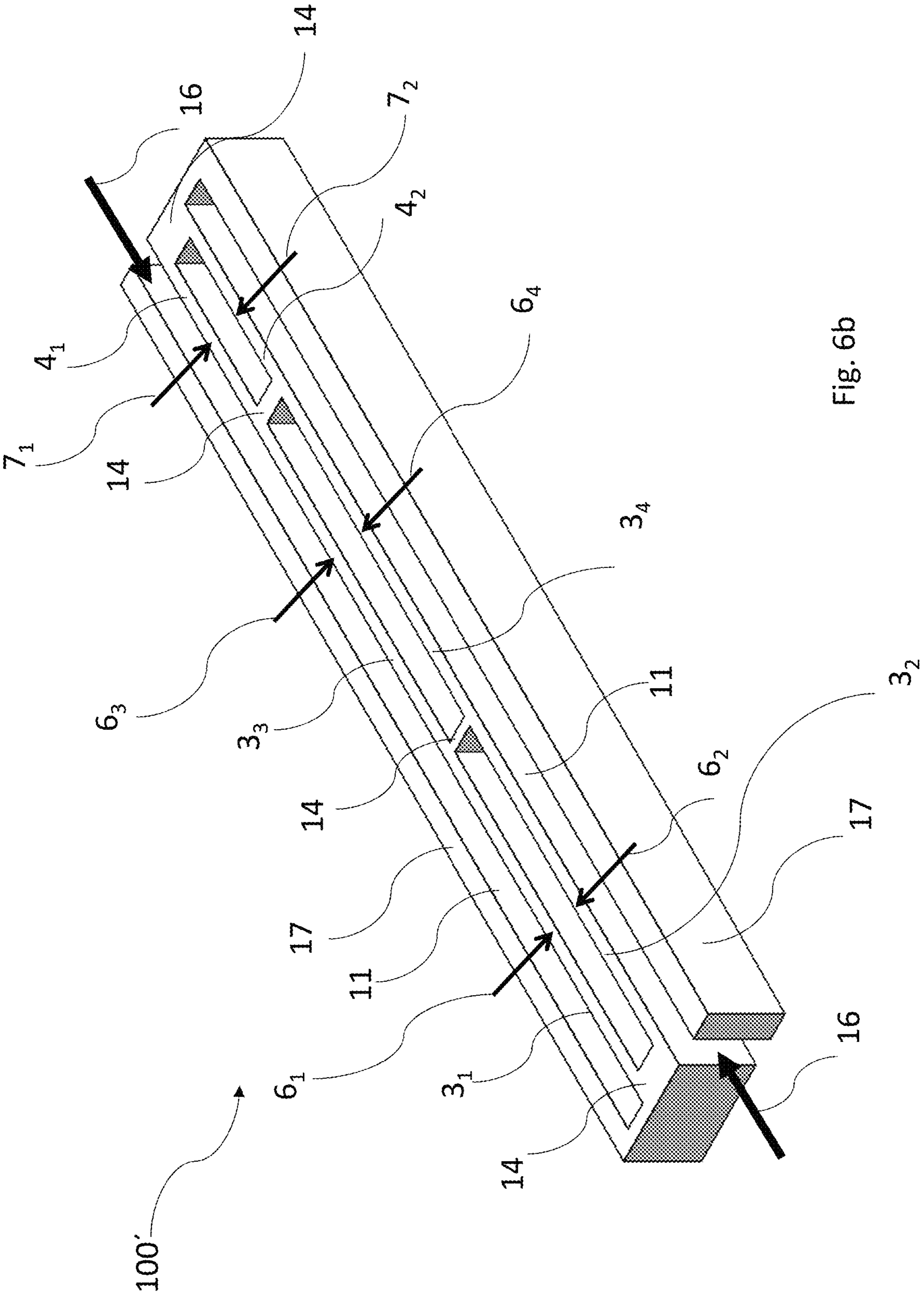
FIG. 6*b* shows, in a perspective illustration, elements of the bending converter of FIG. 6*a* according to an embodiment of the present invention in a further excitation state.

FIG. 6*b* further shows the basic functional principle for interacting with a volume flow, for example for sound generation or for pumping a fluid in such a bending converter system 1 and/or 2. In a second time interval, the bending converters 31, 32, 41 as well as 32, 34 and 42 move away from the opposite boundary 17 of the cavity 11 and hence increase the volume of the cavity 11. The volume flow 16 resulting from this volume increase transports the fluid through the openings 13 into the cavity 11.

Alternative embodiments include no boundary 17 firmly connected to the substrate but further bending converters which can be cantilevered or clamped on two sides and are not shown herein. In this case, in the first time interval, the adjacent bending converter systems 1 and 2 move away from each other to increase the volume of the cavity 11 and move towards each other to reduce the volume of the cavity. Further developments of the embodiments can include a combination of boundaries 17 connected firmly to the substrate and/or not connected firmly to the substrate.

Figure 7:
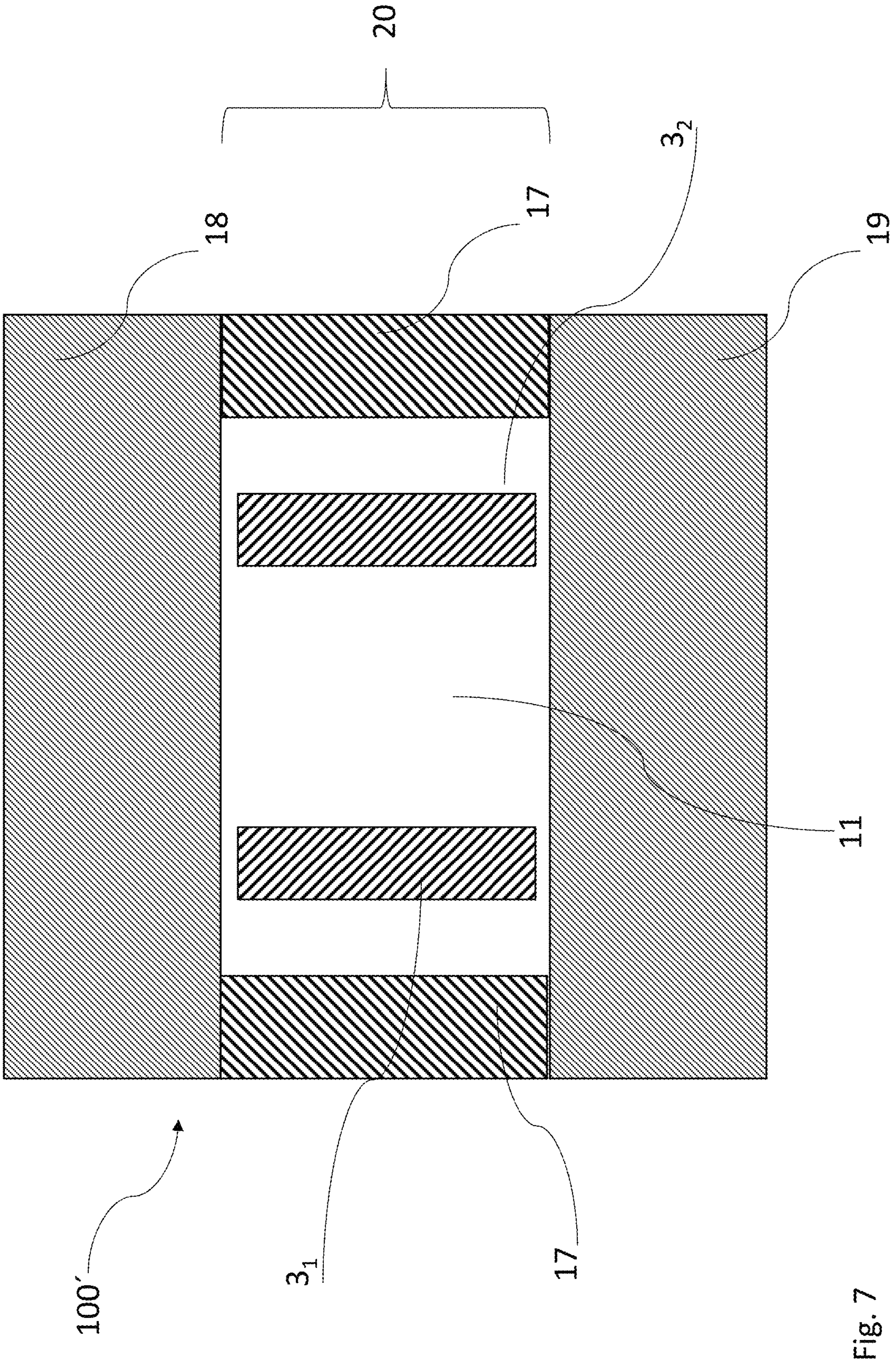
FIG. 7 shows a cross-sectional view of the bending converter according to the embodiment of FIG. 6*a* along the sectional plane A.

FIG. 7 shows a cross-sectional view of a section of a device 100' along the sectional plane A of FIG. 6*a*. Here, the handling wafer 19 and the lid wafer 18 are illustrated, which form the vertical limit of the cavity 11 which is limited by the bending converters 31, 32 and the boundary 17 in the area of the device wafer 20. The structure is a layer stack, wherein the individual layers are connected to one another in a mechanically fixed manner and particularly in a firmly bonded manner. These layers are not illustrated in the figure. The layered arrangement of electrically conductive layers allows a simple configuration since the cavity 11 can be obtained by simple removal from the layer 20 and bending converter structures can remain by suitable adjustment of the production processes. Alternatively, it is also possible to arrange the bending converter structures completely or partly by other measures or processes in the cavity 11, such as by generating and/or positioning within the cavity 11. In this case, the bending converter structures can be formed differently compared to the parts of a layer 20 remaining in the substrate, i.e., can comprise different materials.

Figure 8:
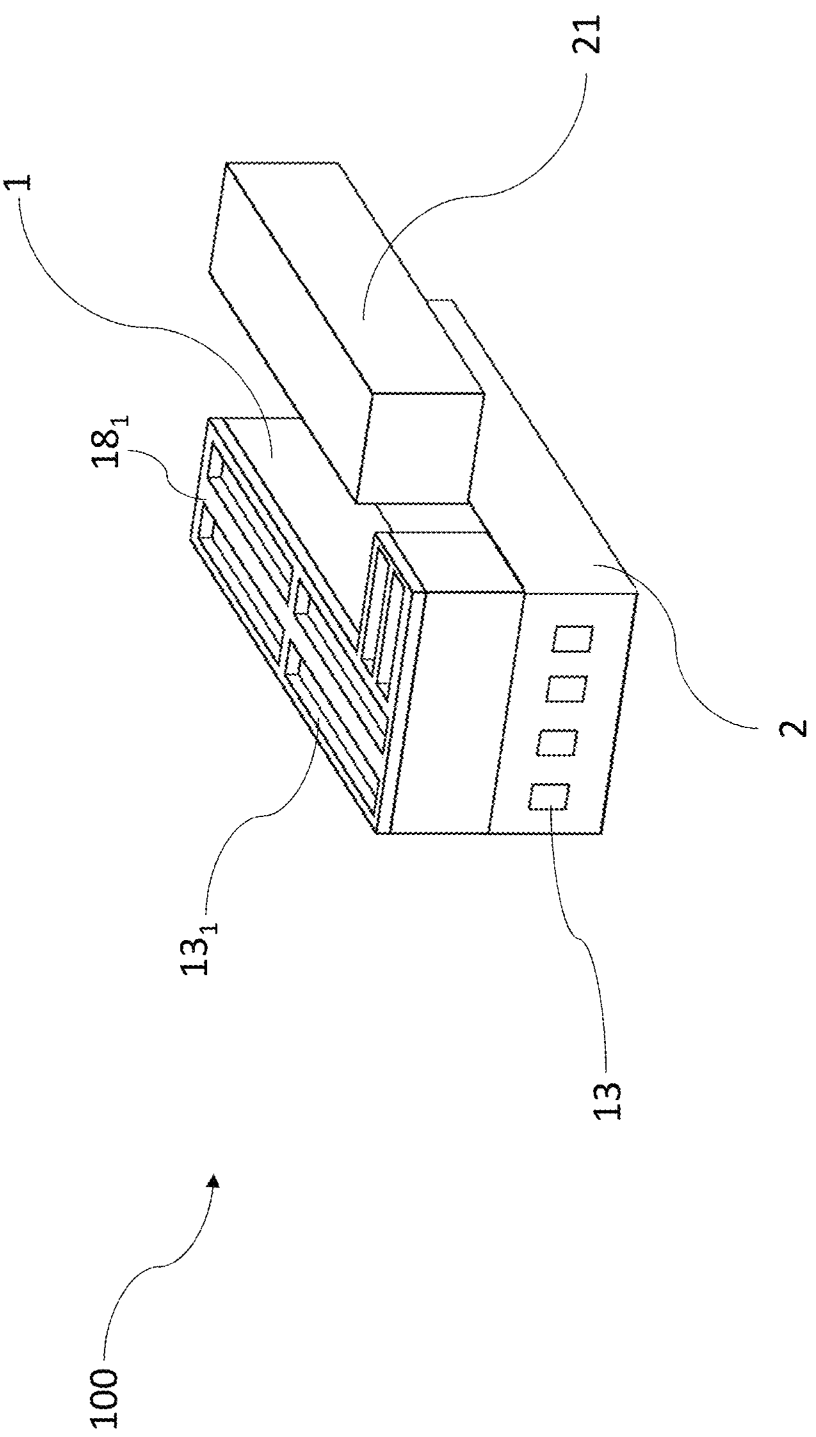
FIG. 8 shows, in a perspective illustration, a bending converter system according to a further advantageous embodiment of the present invention.

FIG. 8 shows, in a perspective illustration, an alternative embodiment of a layered device 100 with an upper bending converter system 1 comprising vertically arranged openings 131 in a lid wafer 181 for connecting the cavities 11 with the environment. A second bending converter system 2 is arranged below the upper first bending converter system 1 and comprises laterally arranged openings 13 in a device wafer 20. Embodiments are not limited to the illustrated system of two bending converter systems 1 and 2, rather, merely one bending converter system 1 or 2 or a plurality of bending converter systems 1, 2, . . . , and can be arranged. A control unit 21 is arranged in immediate proximity, which is part of the device 100 and results in a limitation of the available installation space of the bending converter system 1 and which is connected to the bending converter system (not illustrated). Further openings in the handling wafer 19 of the upper bending converter system 1 can be arranged such that the same are connected to openings in the lid wafer 18 of the second bending converter system 2. In embodiments, a handling wafer 19 of the first bending converter system 1 can be omitted when, by looking ahead to FIG. 9, the device wafer 20' of the second bending converter system 2 can take over this function.

Figure 9:
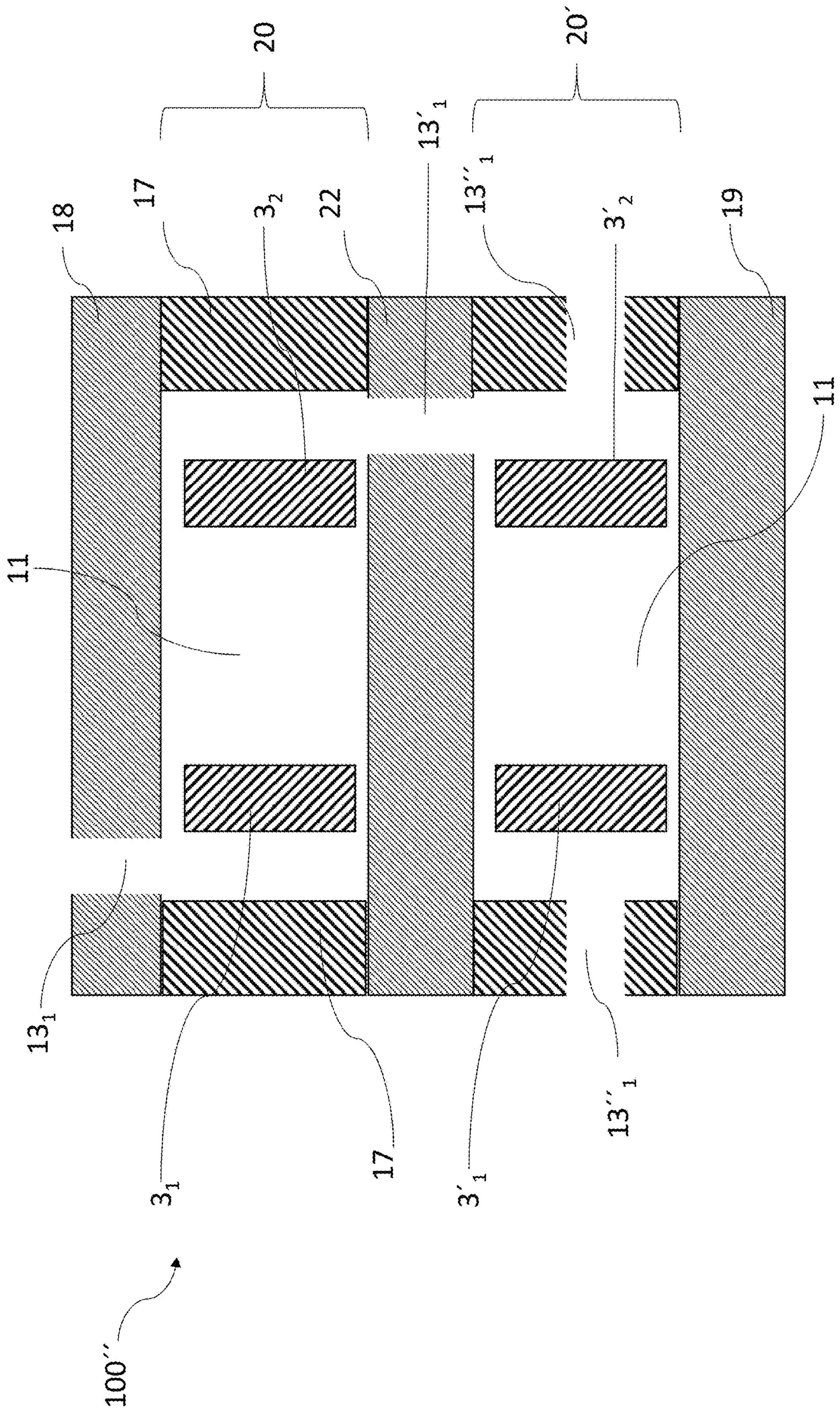
FIG. 9 shows a cross-sectional view of a bending converter according to a further advantageous embodiment of the present invention.

FIG. 9 shows, in a cross-sectional illustration, an embodiment of an alternative device 100" with a top bending converter system 1 comprising vertically arranged openings 131 in the lid wafer 18. In this embodiment, the device wafers 20 and 20' are connected mechanically, in particular firmly bonded to one another via a common substrate layer 22 which represents a lid wafer as well as a handling wafer. This embodiment shows exemplarily how openings 131, 13'1, 13'"1 can be arranged in the lid wafer, handling wafer or device wafer in order to have an optimum orientation with respect to the sound direction. Accordingly, the sound direction can be determined via the volume flow interacting with the environment resulting from the movement of the deformable elements or the bending converter 31, 32, 3'1 and 3'2 of the device 100".

In the following, further possible embodiments according to the invention will be described. In summary, a bending converter 3, 4 and 5, or a bending converter system 1 and/or 2 including one or several of such bending converters 3, 4 and 5, or a device 100, 100', 100" including one or several of such bending converter systems 1 and/or 2 which can, for example, be installed in a hearing aid, can be considered as:

1. Bending Converter System
   - with outer dimensions adapted to a surrounding geometry, and the surrounding geometry comprising a longitudinal axis corresponding approximately to the sound direction
   - includes bending converters of different lengths consisting of deformable elements arranged in cavities and connected to a substrate
   - the deformation of the deformable element takes place transversal to the lateral direction in a substrate plane (in plane)
   - includes a plurality of deformable elements whose respective directions of movement form a common movement plane in the substrate plane
   - the deformable elements have different lengths and thereby realize varying maximum deflections
   - the arrangement of the bending converters of different lengths takes place according to the existing space such that the area usage of the area formed by the movement plane and the outer dimensions of the bending converter system is maximum
   - and the movement plane is inclined with respect to the longitudinal axis 106 of the surrounding geometry at least by an angle.
2. Short bending converters are arranged in the area of the openings,
3. Long bending converters are arranged centrally/where space is available
4. The bending converter system is tilted around a transversal axis of the surrounding geometry.
   - 4.1 The angle of the movement plane 10 with respect to the longitudinal axis 106 of the surrounding geometry is between 90° and 180°, advantageously 150° and 170° and particularly advantageously 160°.
5. In embodiments, the bending converter system is tilted around a longitudinal axis and/or a vertical axis of the surrounding geometry
   - 5.1 Comparable angles to 5.1
6. In embodiments, the shorter bending converters that are arranged in the area of the opening are clamped on one side (cantilevered), whereas the long bending converters are clamped on two sides.

6.1 Clamping on one side possible for bending converters that are shorter than approximately 2000 μm 6.2 Clamping on two sides possible for bending converters that are longer than approximately 1000 μm 6.3 In the bending converter system, any combinations of bending converters that are clamped on one side (cantilevered) or clamped on two sides is possible, the target is high sound pressure with simultaneous broad frequency range 7. Additionally, a device comprising a bending converter system with the above stated features can also include further means:

for fluid-dynamic attenuation
for signal processing
for wireless communication
for voltage transformation
sensors
software
for storing data
for energy supply 8. Headphones include at least one device having a bending converter system with the above stated features, wherein 8.1 Outer dimensions of the headphones almost correspond to the inner dimensions of the auditory canal 8.2 Headphones are configured such that the device is arranged in the auditory canal when a user has inserted the headphones 8.3 Headphones are configured such that the same almost completely close the auditory canal 8.4 Headphones are configured such that their outer dimensions do not correspond to the outer dimensions of the auditory canal of a user but can therefore be produced cost-effectively in large quantities.

Further, arranging the bending converter system as a sound converter system is up to the person skilled in the art. The technical teachings addressed herein disclose features for the person skilled in the art how a plurality of bending converters has to be arranged to obtain high acoustic quality with simultaneous broad frequency range in a limited predefined installation space.

Above that, the person skilled in the art can infer technical teachings how a movement plane is formed by a plurality of directions of movement and how the same can be tilted with respect to longitudinal axis and/or transversal axis and/or vertical axis of the space surrounding the sound converter system.

Predefined spaces are, for example, the geometrical dimensions caused by the auditory canal, further sensors or system technology:

for fluid-dynamic attenuation
for signal processing
for wireless communication
for voltage transformation
for storing data
for energy supply Advantageously, short bending converters of a bending converter system are to be arranged where little space is available and/or in the area of the openings connecting the cavities to the environment. These openings are in the area of the outer limits of the bending converter system. Long bending converters, on the other hand, are mostly arranged centrally in the bending converter system. This has the advantage of utilizing the existing space to an optimum to obtain a high packaging density of the individual bending converters for increasing the sound pressure level. Apart from that, longer bending converters enable lower resonance frequencies due to their low stiffness.

Short bending converters are characterized by comparatively high stiffness which enables high resonance frequencies. As long as these bending converters are arranged in the area of the openings connecting the cavities to the environment, resonances can be prevented and hence the sound quality can be improved.

Advantages of a tilted arrangement in a tube-shaped space, for example, an auditory canal.

The auditory canal is approximately a cylinder having the dimensions L×D=25 mm×0.7 mm (Wiki).

Accordingly, the transversal acoustic resonance of the closed auditory canal (λ/2) is at $U_T$≈235 kHz, the respective longitudinal resonance at $U_L$≈6.6 KHz.

A headphone membrane in "normal, i.e., radial" orientation is excited by the longitudinal mode at $U_L$≈6.6 kHz and thus generates an unwanted audible additional resonance.

A headphone membrane in "axial" positon is only excited by the transversal mode at $U_T$≈235 kHz in first approximation. This is much better since acoustically completely irrelevant. Obviously, the size of the bending converter system (analogously membrane) is to be selected such that low eigenfrequencies of the membrane do not interfere. Therefore, the same should not be too large. At 60° inclination, the first eigenfrequency of an ideal membrane is at approximately 2×6.6 KHz=13.2 kHz. According to everything that is known about "real existing headphones", this is fine.

Due to the tilted arrangement of the bending converter system, a larger footprint of the bending converter system can be arranged in the available space on which again longer or more bending converters can be arranged. By the usage of a greater number of bending converters, higher sound pressures can be obtained.

A further advantage is that openings can be arranged optimally in the direction of the sound direction given by the outer dimensions. For example, FIG. 8 shows vertically arranged openings that are arranged almost in sound direction when the device is arranged in a tilted manner in the auditory canal.

Therefore, the application describes a further development regarding the optimization of the sound quantity (sound pressure level) and sound quality which can be generated by the device in a specific environment.

High integration requirements relate to the adaption to existing installation space in general as well as to the system design of several components.

In ultramobile terminal devices (for example hearables, smartwatches), for example in particular the energy storages as well as possibly existing further HMI components (tactile surfaces, displays) are subject to tight limits of installation space design (cylindrical/cuboid or area-extended/plate-shaped). To still obtain minimization of the installation space, it may be useful to match the sound converter to the remaining installation space and in that way to enable high sound quantity.

Additionally, when designing the systems (ultramobile, such as hearables or wearables in general) aspects of sound quality may not be neglected. Specifically, by a specific design of the sound converter groups, sound generation adapted to the geometric circumstances with regard to sound emission or radiation can be obtained. Key drivers are frequency-dependent effects, wherein interfering resonances can occur in particular at high frequencies.

With the present invention, both the sound quality as well as the sound quantity can be significantly improved.

The principle of the inventive bending converter is based on the NED (nanoscopic electrostatic drive) and is described in WO 2012/095185 A1. NED is a novel MEMS (microelectromechanical system) actuator principle. The basic principle is that a silicon beam moves laterally in a plane, the substrate plane that is defined by a silicon disc or a wafer. Here, the silicon beam connected to the substrate in a cavity interacts with the volume flow. Further, the device includes an electronic circuit arranged in a layer of the layer stack, wherein the electronic circuit is connected to the electromechanical bending converter and is configured to deflect the bending converter due to an electric signal.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An acoustic bending converter system comprising
a plurality of bending converters configured such that deformable elements of the bending converters oscillate coplanarly in a common planar layer, wherein the bending converters comprise different resonance frequencies and different expansions of the deformable elements along a common longitudinal axis that is transversal to a direction of oscillation of the deformable elements.

2. The acoustic bending converter system according to claim 1, comprising:
one or several cavities where the bending converters are arranged, and openings for passing a fluidic volume flow to interact with the plurality of bending converters.

3. The acoustic bending converter system according to claim 1, wherein the deformable element of at least one bending converter can be electrostatically, piezoelectrically or thermomechanically deformed.

4. The acoustic bending converter system according to claim 1, wherein
at least a first subset of at least one first bending converter comprises at least one cantilevered deformable element, and
at least a second subset of at least one second bending converter comprises one deformable element clamped on two sides each.

5. The acoustic bending converter system according to claim 4, wherein
the at least first subset of at least one first bending converter comprises, on average, a higher resonance frequency than the at least second subset of at least one of the second bending converters or vice versa.

6. The acoustic bending converter system according to claim 4, wherein
the at least first subset of at least one first bending converter comprises, on average, a shorter length than the at least second subset of at least one second bending converter.

7. The acoustic bending converter system according to claim 1, wherein
each bending converter borders on at least one cavity and each cavity is accessible via at least one opening for passage of the fluidic volume flow.

8. The acoustic bending converter system according to claim 1, wherein
an outer dimensions of the bending converter system along the common longitudinal axis is between 750 μm and 2000 μm and particularly advantageous between 850 μm and 1250 μm.

9. The acoustic bending converter system according to claim 1, wherein
an external surface of the bending converter system describes a longitudinal oval along the common longitudinal axis, a longitudinal rectangle along the common longitudinal axis or a longitudinal polygon along the common longitudinal axis, coplanar to the common planar layer.

10. The acoustic bending converter system according to claim 1, wherein
the bending converters are divided into groups of one or several bending converters, wherein in groups comprising several bending converters the several bending converters are arranged behind one another along the common longitudinal axis;
and/or wherein
in groups of several bending converters, the several bending converters in the common planar layer are arranged side by side transversal to the common longitudinal axis.

11. An acoustic apparatus comprising
an acoustic bending converter system comprising at least one bending converter comprising at least one deformable element arranged in a cavity, and
an opening through which a fluidic volume flow interacting with a movement of the bending converter in the cavity passes and
a housing adapted to be inserted into an auditory canal, wherein the bending converter system is held in the housing such that the fluidic volume flow is oriented obliquely to a longitudinal axis of the auditory canal and disposed in the auditory canal in a state where the housing is inserted in the auditory canal;
wherein the acoustic bending converter system comprising a plurality of bending converters configured such that deformable elements of the bending converters oscillate coplanarly in a common planar layer, wherein the bending converters comprise different resonance frequencies and different expansions of the deformable elements along a common longitudinal axis that is transversal to a direction of oscillation of the deformable elements, is configured such that the fluidic volume flow runs in the plane of the common planar layer of the bending converter system.

12. The acoustic apparatus according to claim 11, wherein
the bending converter system is held in the housing such that the fluidic volume flow of the acoustic apparatus passes through the openings of the bending converter system, tilted at an angle between 5° and 80°, between 10° and 40° or between 15° and 30° with respect to the longitudinal axis of the auditory canal.

13. The acoustic apparatus according to claim 11, wherein
the acoustic bending converter system is configured to receive and/or emit an acoustic signal via the fluidic volume flow passing through the openings.

14. The acoustic apparatus according to claim 11, further comprising a control unit for controlling the individual bending converters of the bending converter system and an energy supply source for operating the acoustic apparatus.

15. The acoustic apparatus according to claim 11, wherein the bending converter system is held in the housing such that the fluidic volume flow is oriented obliquely to the longitudinal axis of the auditory canal and disposed in the auditory canal in the state where the housing is inserted in the auditory canal, in order to minimize resonances in the auditory canal.

* * * * *